United States Patent [19]

Shigeta et al.

[11] 4,012,653
[45] Mar. 15, 1977

[54] LOW NOISE ALTERNATING CURRENT DYNAMOELECTRO MACHINE

[75] Inventors: Masayuki Shigeta, Katsuta; Ken Ichiryu, Mito; Masaki Miura, Katsuta, all of Japan

[73] Assignee: Hitachi, Ltd., Japan

[22] Filed: Oct. 15, 1974

[21] Appl. No.: 514,924

[30] Foreign Application Priority Data

Oct. 17, 1973  Japan .......................... 48-115896

[52] U.S. Cl. ............................... 310/217; 310/51; 310/259; 310/264
[51] Int. Cl.² ........................................... H02K 1/06
[58] Field of Search ........ 310/51, 42, 40 MM, 180, 310/185, 216, 217, 218, 254, 258, 259, 261, 264, 265, 269, 195, 209; 74/574; 336/100, 210

[56] References Cited

UNITED STATES PATENTS

| | | | |
|---|---|---|---|
| 580,011 | 4/1897 | Short | 310/265 |
| 587,765 | 8/1897 | Short | 310/265 |
| 2,112,747 | 3/1938 | Wood | 310/51 |
| 2,900,537 | 8/1959 | Morse | 310/51 |
| 2,944,171 | 7/1960 | Alger | 310/51 |
| 2,956,186 | 10/1960 | Wall | 310/51 |
| 3,278,773 | 10/1966 | Mikina | 310/51 |
| 3,373,633 | 3/1968 | Desmond | 74/574 |
| 3,531,667 | 9/1970 | Barton | 310/51 |

FOREIGN PATENTS OR APPLICATIONS 1,026,840  3/1958  Germany ........................... 310/51

*Primary Examiner*—R. Skudy
*Attorney, Agent, or Firm*—Craig & Antonelli

[57] ABSTRACT

In an alternating current dynamoelectro machine, the rotor core and/or stator core are axially divided into a plurality of blocks, adjacent blocks of the rotor core and/or those of the stator core are fixed to the rotor shaft and to the motor frame, respectively, at different positions on circumference of respective blocks, whereby an interactive vibration energy between the blocks is absorbed by relative vibrations produced between the adjacent blocks so that vibrations and noises of the machine can be reduced.

12 Claims, 7 Drawing Figures

LOW NOISE ALTERNATING CURRENT DYNAMOELECTRO MACHINE

BACKGROUND OF THE INVENTION

1. FIELD OF THE INVENTION

This invention relates to low noise alternating current dynamoelectro machines wherein electromagnetic vibrations of the machine are suppressed, more particularly their core structures wherein electromagnetic vibrations caused in the rotor core or stator core by speed controlling with thyristors are reduced.

2. DESCRIPTION OF THE PRIOR ART

Recently, for AC motors generally exemplified by single-phase and three-phase induction motors, speed controlling with thyristors has widely been employed. Especially, AC motors used for elevators are required to rotate smoothly independent of the magnitude of load under a given acceleration and deceleration. For this reason, upon speed controlling, a DC current obtained by full-wave rectification of an AC current is passed through the field winding of AC motor and the intensity of a magnetic field induced from the DC current is adjusted to control the rotation of the AC motor. Average value of the DC current flow through the field winding is adjusted by controlling the ignition angle of thyristors.

However, a high frequency current produced when the ignition angle of thyristors is controlled induces a high frequency distortion in the magnetic flux between the rotor and stator, and an electromagnetic force due to the magnetic flux distortion causes electromagnetic vibrations and noises in the AC motor.

The electromagnetic force wave due to the high frequency magnetic flux between the rotor and stator varies at a frequency as a function of the slip of the AC motor. Therefore, when the natural frequency of the rotor core or stator core coincides with frequency of the electromagnetic force wave, a resonance is caused with the result that the vibrations and noises are accelerated.

Specifically, since AC motors such as for elevators undergo a frequent start-stop operation and are installed indoors, it is an important problem for them to solve that vibrations are reduced.

A conventional measure to prevent such electromagnetic vibrations was either to increase a gap between the rotor and stator or to let a magnetic circuit through the rotor and stator have more allowance than that practically required. The measure, however, was disadvantageous in that not only efficiency of the AC motor was degraded but also size and weight thereof were increased.

In addition, the rotor core, stator core and a support structure therefor were so designed under calculation of their natural frequencies that their natural frequencies were not coincident with a frequency of the electromagnetic force wave. The calculation of natural frequencies of the rotor core, stator core and the support structure therefor, however, suffers from indefinite factors mainly depending on coupling conditions of the support structure and a highly precise calculation of these natural frequencies was not expected. On the other hand, the frequency of the electromagnetic force wave will vary with supply voltage distortion due to the speed controlling with thyristors, and start and deceleration of the AC motor as well as slip fluctuations due to pole change.

SUMMARY OF THE INVENTION

An object of this invention is to provide a low noise AC motor subject to small electromagnetic vibrations.

Another object of this invention is to provide a low noise AC motor subject to small electromagnetic vibrations and having a high efficiency.

Still another object of this invention is to provide a low noise AC motor subject to small electromagnetic vibrations and having a small size and weight.

Still another object of the invention is to provide a low noise AC motor subject to small electromagnetic vibrations and with a simple construction.

This invention is featured in that an energy of electromagnetic vibrations caused in ring shaped lamination cores of an AC motor by a high frequency magnetic flux is absorbed by relative vibrations produced at contact surfaces between adjacently opposed cores arranged such that they are subject to dephased relative vibrations, whereby the electromagnetic vibrations and noises of the AC dynamoelectro machine can be reduced.

In accordance with this invention, in order to produce dephased relative vibrations, adjacent ring cores are fixed to the motor shaft or to the motor frame at different positions on circumference of respective cores.

DETAILED DESCRIPTION OF THE PREFERRED EMBODIMENTS

Figures 1A, 1B:
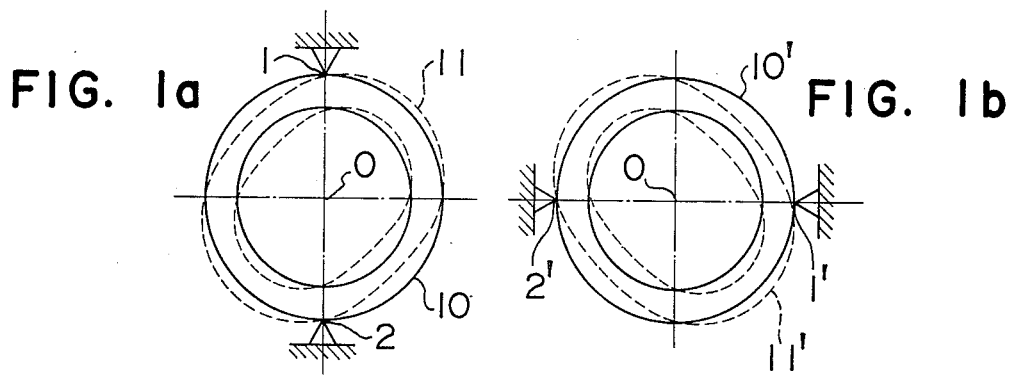
FIGS. 1a and 1b are diagramatic representations useful to explain a principle of the invention. in which two different mode vibrations of two ring cores are illustrated.

Referring now to FIG. 1, the principle of the invention will be described. FIG. 1a shows a vibration mode of a ring 10 which is supported at a pair of stationary points 1 and 2 located on its circumference in a symmetrical relation with respect to center O, when an electromagnetic force due to a high frequency magnetic flux acts on the ring 10. The ring 10 is subject to such a vibration as defined by vibration nodes at least the stationary points 1 and 2 and M number of wavelengths confined in the entire circumference. An elliptical ring 11 designated at dotted curve line corresponds to a maximum amplitude caused when M = 2, i.e. when so-called two-wave mode vibration is produced wherein two wavelengths are confined in the entire circumference.

FIG. 1b shows the two-wave mode vibration caused when the same electromagnetic force as in FIG. 1a acts on a ring 10' supported at stationary points 1' and 2' located at circumferential positions subject to a rotation around the center O by 90° with respect to the stationary points 1 and 2 shown in FIG. 1a.

As seen from FIGS. 1a and 1b, when the same electromagnetic force acts on two rings supported at differently located stationary points, vibrations in an out of phase relation are produced at the loops of respective vibrations of the two rings. Therefore, if an electromagnetic force acts on ring 10 of FIG. 1a and ring 10' of FIG. 1b which have been brought into close contact with each other, vibrations of out of phase are produced on the contact surface between the two rings in the loop of respective vibrations of the rings 10 and 10', so that the vibrations of the two rings are subject to a snubber function wherein they are suppressed by each other. Through the snubber function, the vibration energy can be absorbed and the vibrations can be reduced.

In the principle of the invention as described above, when the number M of wavelengths is equal to and more than three wherein higher harmonic ripples are produced, a similar effect can be brought about.

In the foregoing description, two sets of stationary points have been subject to relative rotation by 90° to each other with respect to the center O. In case where the adjacent rings with respective stationary points subject to a relative rotation of an optional angle to each other are brought into close contact with each other and applied with an electromagnetic force, relative vibrations on a contact surface between the adjacent rings are produced not only at the loop of the vibration of respective rings but also at the node, thereby to attenuate the vibrations.

Further, in the foregoing description two stationary points for each ring have been used. This invention can be applied to a ring with an optional number of stationary points. In this case, in view of balance of the ring vibrations and attenuation rate thereof, the two adjacent rings are preferably arranged in such a manner that one ring with stationary points evenly spaced on its circumference is opposed in close contact with the other ring with the same number of stationary points, two of which are positioned on its circumference so as to subtend by half the even spacing of the former ring.

The invention will be explained in detail in the following. The following description is made only with respect to an AC motor, but it should be noted that the invention in applicable to an AC generator.

Figure 2:
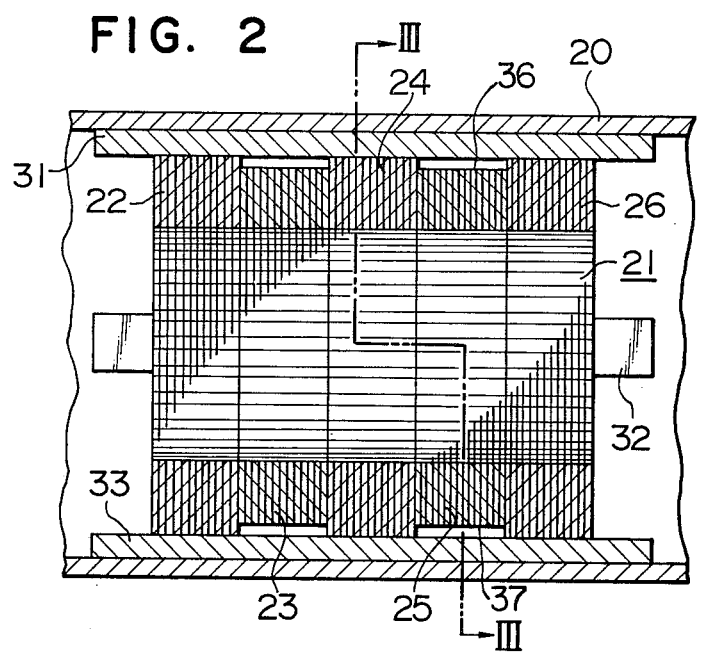
FIG. 2 is a partial longitudinal section view of an AC motor incorporated with a stator core embodying the invention.
Figure 3:
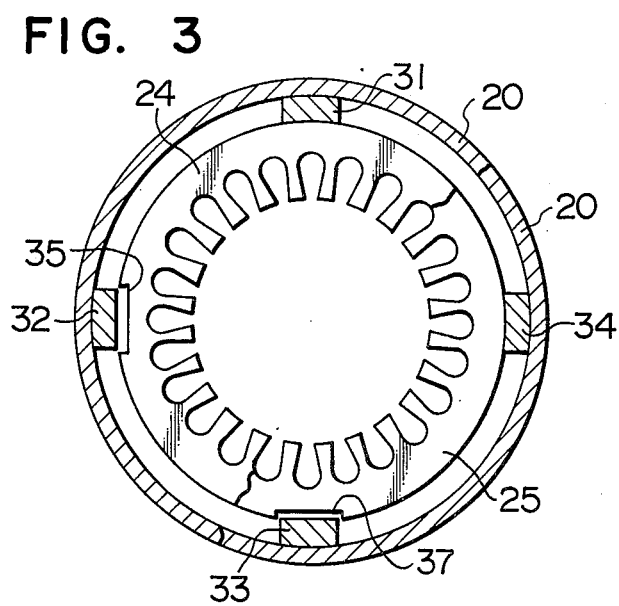
FIG. 3 is a cross-sectional view of the AC motor shown in FIG. 2, taken along the line III — III.

Turning now to FIGS. 2 and 3, an AC motor shown therein comprises a stator core 21 of ring laminations of magnetic material fixed by shrinkage fit to ribs 31, 32, 33 and 34 welded to the inner wall of a cylindrical frame 20 of the AC motor in even space relationship.

Stator core 21 consists of five blocks 22, 23, 24, 25 and 26 axially arranged, which blocks are in close contact with each other at opposed surfaces thereof.

Blocks 22, 24 and 26 are fixed to ribs 31 and 33 whereas they are spaced from ribs 32 and 34 through recesses formed in these blocks. A recess 35, for example, corresponds to one of two recesses formed in the block 24. On the other hand, blocks 23 and 25 arranged between the blocks 22 and 24 and between the blocks 24 and 26, respectively, are fixed to ribs 32 and 34 whereas they spaced from ribs 31 and 33 through recesses formed in these blocks. In the block 25, for example, are formed recesses 36 and 37.

With this construction, the group of blocks 22, 24 and 26 vibrate in a mode of different phase from the other group of blocks 23 and 25 so that relative vibrations in contact surfaces between the blocks of different groups attenuate the entire vibration of the blocks.

In this embodiment, lamination cores of the blocks 22, 24 and 26 and the blocks 23 and 25 are formed with recesses to prevent contact with the ribs 32 and 34 and the ribs 31 and 33, respectively. Alternatively, the ribs may be formed with recesses at portions required to be prevented from contact with the blocks.

Figure 4:
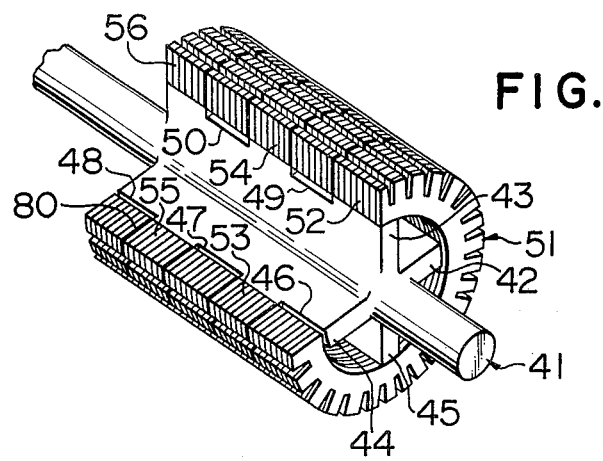
FIG. 4 is a perspective view of a rotor, partially exploded, embodying the invention.

Turning now to FIG. 4, a rotor of AC motor shown therein comprises a rotor core 51 fixed by shrinkage fit to four ribs 42, 43, 44 and 45 of rotor shaft 41.

Rotor core 51 is axially divided into five blocks 52, 53, 54, 55 and 56, wherein the blocks 52, 54 and 56 are fixed to the ribs 43 and 45 whereas they spaced from the ribs 42 and 44 through recesses formed therein. In the rib 44, for example, are formed recesses 46, 47 and 48. Similarly, blocks 53 and 55 arranged between the blocks 52 and 54 and between the blocks 54 and 56, respectively, are fixed to the ribs 42 and 44 whereas spaced from the ribs 43 and 45 through recesses formed therein. The rib 43, for example, is formed with recesses 49 and 50.

In this embodiment, the ribs formed with recesses are made not to contact with the blocks. Alternatively, as in the stator, the blocks may be formed with recesses at portions required to be prevented from contacting with the ribs.

Figure 5:
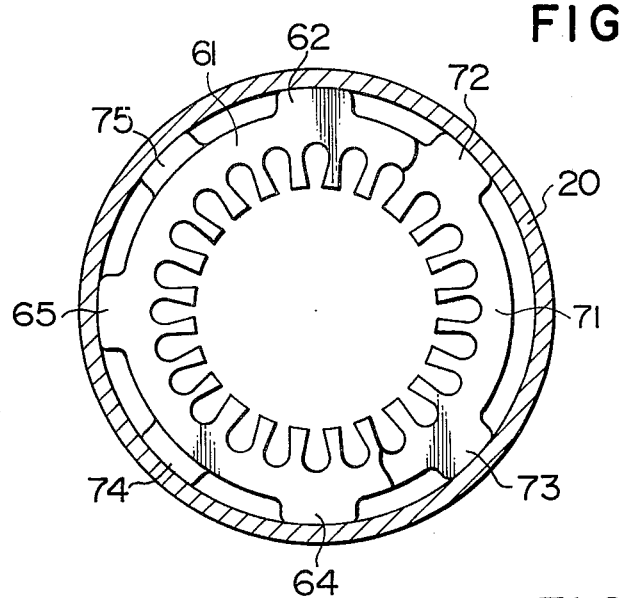
FIG. 5 is a cross-sectional view of an AC motor incorporated with a modified stator of the invention.

FIG. 5 shows a modified stator core in accordance with the invention.

In the figure, numeral 61 designates one of stator core blocks axially divided which has four bosses 62, 63 (not shown), 64 and 65 evenly spaced on its circumference. Numeral 71 designates another one of stator core blocks axially divided which is adjacent to block 61 and which has four bosses 72, 73, 74 and 75 evenly spaced on its circumference. These blocks are fixed by shrinkage fit to the inner peripheral surface of a frame 20 in an even space relationship.

By fixing the stator core to the frame without resort to the ribs but by means of the bosses, the same effect as in FIGS. 2 and 3 can be obtained. Similarly, by means of bosses added to the inner peripheral surface of the rotor core, the rotor may be fixed to the rotor shaft to attain the same effect as in FIG. 4.

In the embodiments shown in FIGS. 2 and 4, portions of the lamination core and of the rib are formed with recesses to prevent contact between the core and rib. With this construction, however, contact area between the core and rib may be reduced. Thus, some of the blocks axially divided may be fixed to all of the ribs in order to provide a sufficient fixing strength.

Figure 6:
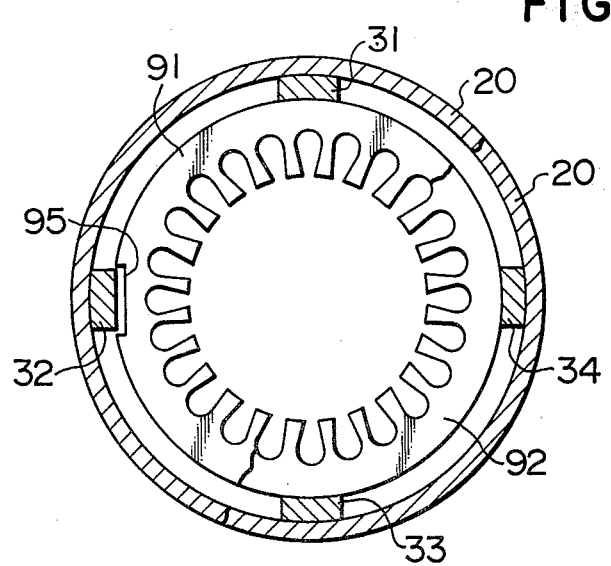
FIG. 6 is a cross-sectional view of an AC motor incorporated with a further modified stator of the invention.

In a modification shown in FIG. 6, the stator core is fixed by shrinkage fit to four ribs 31, 32, 33 and 34 welded to the inner surface of the frame 20.

One of the stator core blocks axially divided, as designated at 91, is fixed to ribs 31 and 33 just as the block 24 of FIG. 3 whereas spaced from ribs 32 and 34 through recesses 95 and 96 (not shown) formed in the core. Another block 92 adjacent to the block 91 is partially illustrated. The block 92 is fixed to all of the ribs 31, 32, 33 and 34.

In a further modification, visco-elastic layers are provided between axially divided blocks to enhance absorptive ability for vibrations between the blocks. Since temperature rise in the core usually reaches 170° to 180° C during motor operation, it is advisable in consideration of heat-proof to use layers of bridging polyethylene as the visco-elastic layers. As shown in FIG. 4, between the blocks 52 and 53 producing out of phase modes of vibrations are interposed a visco-elastic layer 80.

The following effects could be observed from experiments on the embodiments described above:

1. When the AC motor applied with the present invention was speed-controlled with thyristors, noises upon acceleration and deceleration were reduced from conventional 60 dB and 75 dB to 50 dB and 60 dB, respectively.

2. Conventionally required gap length of 0.7 mm for reducing the electromagnetic noises was reduced to 0.4 mm. This improves the power factor of the AC motor, conventionally 82 to 83%, to 92%.

3. The reduced gap length assures manufacture of an AC motor of the same output with ⅔ in weight, as compared to conventional one, giving rise to reduction in manufacturing cost to ⅔.

We claim:

1. An AC dynamoelectro machine comprising at least one hollow and cylindrical magnetic core consisting of a stack of a plurality of ring laminations of magnetic material, said core being axially divided into a plurality of blocks, each said block being supported at a plurality of positions on its surface parallel to the axis of the core, at least one of the supporting positions of a first one of adjacent two said blocks being arranged in different location to those of a second one of said adjacent two blocks along the circumference of the core, said first and second blocks being closely contacted with each other in the axial direction, said blocks being stacked with visco-elastic layers interposed therebetween.

2. An AC dynamoelectro machine according to claim 1, wherein each said block is supported at evenly spaced positions on said parallel surface, and the supporting positions of said first block are arranged along the circumference of the core in the middles of adjacent supporting positions of said second block.

3. An AC dynamoelectro machine according to claim 2, wherein a plurality of ribs parallel to the axis of the core are disposed in evenly spaced relation with each other along the circumference of the core, and said first block is fixed to alternate ones of said ribs and said second block is fixed to remaining ones of said ribs.

4. An AC dynamoelectro machine according to claim 3, wherein said first block has recesses in portions, in said parallel surface, corresponding to said remaining ones of said ribs, and said second block has recesses in portions, in said parallel surface, corresponding to said alternate ones of said ribs.

5. An AC dynamoelectro machine according to claim 3, wherein said alternate ones of said ribs have respective recesses in portions corresponding to said parallel surface of said second block, and said remaining ones of said ribs have respective recesses in portions corresponding to said parallel surface of said first block.

6. An AC dynamoelectro machine comprising a hollow and cylindrical stator core consisting of a stack of a plurality of ring lamination of magnetic material, a hollow and cylindrical frame member for housing and supporting said stator core therewithin, a hollow and cylindrical rotor core consisting of a stack of a plurality of ring lamination of magnetic material disposed coaxially with said stator core, and a rotor shaft inserted into said rotor core for supporting said rotor core, wherein a plurality of ribs parallel to the axis of the cylindrical frame member are disposed on the inner peripheral surface of said frame member in evenly spaced relation with each other along the circumference of the inner peripheral surface, and said stator core is axially divided into a plurality of bocks, a first one of adjacent two said blocks being fixed on its outer peripheral surface to alternate ones of said ribs and a second one of said adjacent two blocks being fixed on its outer peripheral surface to remaining ones of said ribs, said first and second blocks being closely contacted with each other in the axial direction, said blocks being stacked with viscoelastic layers interposed therebetween.

7. An AC dynamoelectro machine according to claim 6, wherein said first block has recesses in portions, in said outer peripheral surface thereof, corresponding to said remaining ones of said ribs, and said second block has recesses in portion, in said outer peripheral surface thereof, corresponding to said alternate ones of said ribs.

8. An AC dynamoelectric machine according to claim 6, wherein said alternate ones of said ribs have respective recesses in portions corresponding to said outer peripheral surface of said second block, and said remaining ones of said ribs have respective recesses in portions corresponding to said outer peripheral surface of said first block.

9. An AC dynamoelectro machine comprising a hollow and cylindrical stator core consisting of a stack of a plurality of ring lamination of magnetic material, a hollow and cylindrical frame member for housing and supporting said stator core therewithin, a hollow and cylindrical rotor core consisting of a stack of a plurality of ring lamination of magnetic material disposed coaxially with said stator core, and a rotor shaft inserted into said rotor core for supporting said rotor core, wherein a plurality of ribs parallel to the axis of the cylindrical frame member are disposed on the inner peripheral surface of said frame member in evenly spaced relation with each other along the circumference of the inner peripheral surface, and said stator core is axially divided into a plurality of blocks, a first one of adjacent two said blocks being fixed on its outer peripheral surface to alternate ones of said ribs and a second one of said adjacent two blocks being fixed on its outer peripheral surface to remaining ones of said ribs, said first and second blocks being closely contacted with each other in the axial direction, and wherein a plurality of ribs parallel to said rotor shaft are disposed on the surface of said rotor shaft in evenly spaced relation with each other along the circumference of said rotor shaft, and said rotor core is axially divided into a plurality of blocks, first one of adjacent two said blocks being fixed on its inner peripheral surface to alternate ones of said ribs of the rotor shaft, and said second block being fixed on its inner peripheral surface to remaining ones of said ribs, said first and second blocks being closely contacted with each other in the axial direction.

10. An AC dynamoelectro machine according to claim 9, wherein said first block of the rotor core has recesses in portions, in said inner peripheral surface thereof, corresponding to said remaining ones of said ribs of the rotor shaft, and said second block of the rotor core has recesses in portion, in said inner peripheral surface thereof, corresponding to said alternate ones of said ribs of the rotor shaft.

11. An AC dynamoelectric machine according to claim 9, wherein said alternate ones of said ribs have respective recesses in portions corresponding to said inner peripheral surface of said second block of the rotor core, and said remaining ones of said ribs have respective recesses in portions corresponding to said inner peripheral surface of said first block of the rotor core.

12. An AC dynamoelectro machine comprising a hollow and cylindrical stator core consisting of a stack of a plurality of ring lamination of magnetic material, a hollow and cylindrical frame member for housing and supporting said stator core therewithin, a hollow and cylindrical rotor core consisting of a stack of a plurality of ring lamination of magnetic material disposed coaxially with said stator core, and a rotor shaft inserted into said rotor core for supporting said rotor core, wherein a plurality of ribs parallel to the axis of the cylindrical frame member are disposed on the inner peripheral surface of said frame member in evenly spaced relation with each other along the circumference of the inner peripheral surface, and said stator core is axially divided into a plurality of blocks, a first one of adjacent two said blocks being fixed on its outer peripheral surface to alternate ones of said ribs and a second one of said adjacent two blocks being fixed on its outer peripheral surface to remaining ones of said ribs, said first and second blocks being closely contacted with each other in the axial direction, said blocks of the rotor core being stacked with visco-elastic layers interposed therebetween.

* * * * *